United States Patent [19]

Tokarz

[11] 4,350,968
[45] Sep. 21, 1982

[54] LIQUID LEVEL DETECTOR
[75] Inventor: Richard D. Tokarz, West Richland, Wash.
[73] Assignee: The United States of America as represented by the United States Department of Energy, Washington, D.C.
[21] Appl. No.: 229,422
[22] Filed: Jan. 29, 1981
[51] Int. Cl.³ .............................................. H01C 7/00
[52] U.S. Cl. ........................................ 338/13; 338/28
[58] Field of Search ....................... 338/13, 25, 27, 28, 338/229, 49, 80, 120, 222; 73/304 R, 295; 340/620

[56] References Cited
U.S. PATENT DOCUMENTS

| | | | |
|---|---|---|---|
| 2,792,566 | 5/1957 | Shanhouse et al. | 340/620 |
| 3,437,107 | 4/1969 | Waseleski, Jr. | 73/295 |
| 3,792,407 | 2/1974 | Ehrenfried et al. | 338/13 |
| 3,896,409 | 7/1975 | Micheli et al. | 73/295 X |
| 3,905,243 | 9/1975 | Goldfuss | 73/295 |
| 4,277,773 | 7/1981 | Blatnik | 338/13 X |

Primary Examiner—C. L. Albritton
Attorney, Agent, or Firm—Robert Southworth, III; Richard E. Constant; Richard G. Besha

[57] ABSTRACT

A liquid level sensor having a pair of upright conductors spaced by an insulator defining a first high resistance path between the conductors. An electrically conductive path is interposed between the upright conductors at a discrete location at which liquid level is to be measured. It includes a liquid accessible gap of a dimension such that the electrical resistance across the conductor when the gap is filled with the liquid is detectably less than when the gap is emptied. The conductor might also be physically altered by temperature changes to serve also as an indicator of elevated temperature.

5 Claims, 6 Drawing Figures

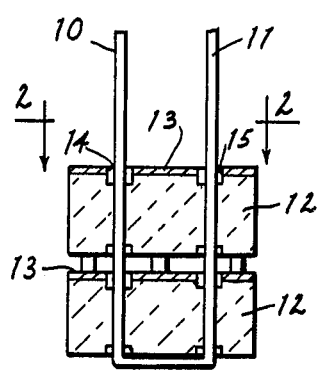
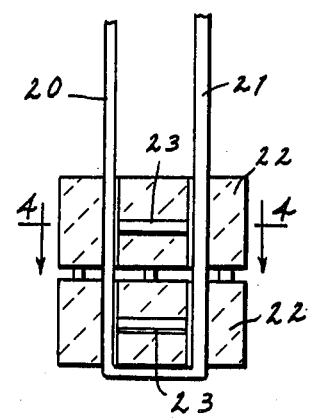
Fig 1      Fig 3
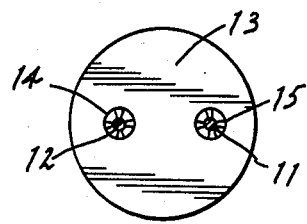
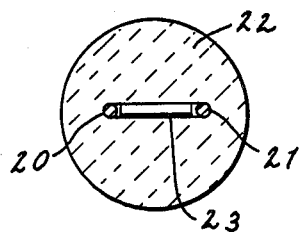
Fig 2      Fig 4
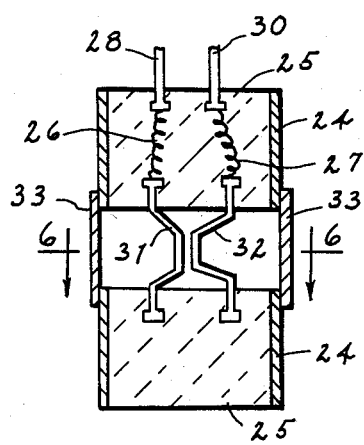
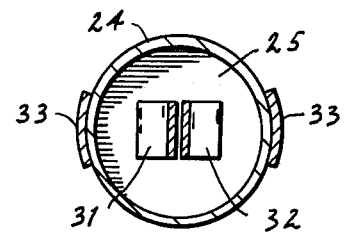
Fig 5      Fig 6

LIQUID LEVEL DETECTOR

BACKGROUND OF THE INVENTION

This disclosure relates to liquid level sensors and is specifically directed to devices for detecting coolant level changes in nuclear reactors. The U.S. government has rights in this invention pursuant to Contract No. EY-76-C-06-1830 between the U.S. Department of Energy and Battelle Memorial Institute.

This invention arose from tests requiring an indication of coolant liquid levels within nuclear reactors. It meets instrumentation requirements for control room indications of coolant level as one element in the monitoring of operational parameters to protect against elevated fuel rod temperatures that might otherwise remain undetected.

The present invention arose from research and testing conducted on nuclear cores to resolve questions caused by small or medium breaks and resulting loss of coolant accidents. Continuing slow leakage of reactor coolant can ultimately result in boiling of the coolant, which then exposes a portion of the fuel rods to very high temperature steam or vapors. The resulting inadequate cooling of the fuel rods can elevate their temperatures resulting in the rupture of cladding and possible melting of portions of the fuel and cladding.

In many nuclear reactor installations, the only control room indication for such conditions is provided by thermocouples in the reactor core. Such thermocouples are located at discrete locations and are limited in number. They do not provide a specific indication of coolant level and the operators of such equipment have no means for determining coolant level at an early stage of an accident.

These deficiencies have resulted in efforts to design a liquid level sensor that can operate within a reactor core to monitor coolant level and provide readily available indications of coolant level changes. Such sensors must withstand high radiation levels and continuous immersion in the coolant, as well as very high steam or vapor temperatures which will occur during a loss of coolant accident. Such temperatures can reach as high as 2500 K.

The present device consists of two or more electrical conductors supporting or strung on insulators which space them apart. A conductive layer of material is interposed between the conductors to form an interruptible resistance path between them which includes a very small electrical gap which is accessible to the coolant. The electrical resistance across this path when the gap is filled with liquid is detectably less than when the gap is emptied. One can therefore monitor the resistance between the conductors to determine whether the liquid level is above or below the preselected elevation of the gap.

SUMMARY OF THE INVENTION

The disclosed liquid level detector basically includes a pair of upright electrical conductors with a mass of insulating material spacing them relative to one another across a first, high electrical resistance path. A conductive layer is interposed between the two conductors at discrete locations along their respective lengths, creating an interruptible second resistance path between them. A liquid accessible gap is included between at least one conductor and the conductive layer. The electrical resistance across the second lower resistance path when the gap is filled with liquid or coolant is detectably less than when the gap is emptied. Monitoring of the resistance across the conductors therefore provides electrical signals indicative of liquid depth.

It is a first object of the invention to provide a liquid level detector capable of functioning continuously while submerged in coolant within a reactor environment.

Another object of the invention is to provide a liquid level detector capable of operating under conditions of extremely elevated temperatures and pressures.

These and further objects will be evident from the following disclosure.

DESCRIPTION OF THE DRAWINGS

FIG. 1 is a vertical sectional view through a first form of the invention;

FIG. 2 is a sectional view taken along line 2—2 in FIG. 1;

FIG. 3 is a vertical sectional view through a second form of the invention;

FIG. 4 is a sectional view taken along line 4—4 in FIG. 3;

FIG. 5 is a vertical sectional view through a third form of the invention;

FIG. 6 is a sectional view taken along line 6—6 in FIG. 5.

DESCRIPTION OF THE PREFERRED EMBODIMENTS

Illustrative forms of the disclosed device are set out in general detail in FIGS. 1, 3 and 5. Each includes a pair of high temperature electrical conductors having relatively high electrical resistance and arranged in an upright orientation. At least a portion of the length of these conductors would normally be submerged beneath the liquid level of the coolant or other fluid being monitored. While this disclosure is particularly applicable to water-cooled nuclear reactors, it is to be understood that the liquid level detector might be used in monitoring the level of any liquid and might be incorporated within any other apparatus where liquid level is an operating parameter.

Submerged portions of the two conductors are fixedly spaced from one another by electrical insulating means, thereby defining a first resistance path across the conductors having relatively high electrical resistance. The amount of resistance will depend upon the choice of insulating material. An electrical conductor or layer of electrical material is interposed between the two conductors at discrete locations along their respective lengths. It creates an interruptible second resistance path between them at the elevation or level at which the liquid level is to be monitored. A liquid accessible gap is presented between the conductors. The gap width is such that the electrical resistance across the second resistance path between the conductors when the gap is filled with the liquid is detectably less than when the gap is emptied. Stated differently, available instrumentation connected to the conductors is capable of detecting differences in resistance across the second resistance path to determine whether the gap is filled with liquid or not.

While pure water is often considered as having no electrical conductivity, such a statement is not absolutely true. It is known that the actual electrical resistivity of pure water is related to the volume of water interposed between two conductors. The closer the spacing of the conductors, the lower is the resistivity of the water. As an example, the resistivity of pure water may be 10KΩ when the spacing between conductors is 0.1 inches. Placing the conductors very close together (on the order of a few microns) dramatically reduces the resulting electrical resistance of the water interface. The liquid accessible gap used in the embodiments of this invention will be of such a physical magnitude (when used with pure water) that the change in resistivity is easily detectable in comparison with the resistivity of the associated electrical elements.

Referring to FIG. 1, a first form of the level detector is shown as having a pair of upright conductors 10 and 11. These conductors 10 and 11 are preferably made from a high resistance conductive material such as tungsten. Tungsten also has the physical ability to withstand extremely elevated temperatures. Since two or more of these detectors might be stacked along the conductors 10 and 11, it is important to use conductors of high electrical resistivity so as to be able to detect resistivity changes along their length with accuracy.

A mass of electrical insulation 12 surrounds the conductors 10 and 11. It fixedly spaces them relative to one another across a first resistance path through the insulator 12. The insulator 12 should be made from a material having a very high electrical resistance. It is preferably fabricated as a ceramic or metal oxide bead, the material again being selected so as to be capable of withstanding extremely high temperatures and pressures, as well as being stable when submerged in the coolant or liquid being monitored. It must remain structurally intact under the environmental conditions under which it is used.

In the FIG. 1 embodiment, the upper surface of insulator 12 has bonded to it a layer of electrically conductive material 13. The layer of material 13 includes apertures 14 and 15 surrounding the respective conductors 10 and 11 (FIG. 2). The radial separation between the outer surfaces of conductors 10 and 11 and the inner edges of the respective apertures 14, 15 constitutes the "liquid accessible gap" in this embodiment. The surface layer 13 is exposed to the surrounding liquid whose level is to be monitored. The insulator 12 is formed with elongated apertures loosely receiving the conductors 10 and 11 and permitting vertical liquid flow along the conductors.

The conductive layer 13 can be applied to insulator 12 by flame spraying or vapor deposition techniques. The width of the gap across the conductive layer 13 should be as small as practical so as to keep the resistance across this path as low as possible in relation to the resistance in the conductors 10 and 11 themselves. While the illustration shows a gap surrounding each conductor 10 and 11, it is to be understood that at least one of the conductors must have a gap between it and the conductive layer 13. It would be possible to construct the device with direct contact between one of the conductors and layer 13, the resistivity change then being effected by the presence of liquid in the gap separating the layer 13 and the remaining conductor.

The dimension of the gap between the conductors 10 and 11 and the conductive layer 13 is selected so that the electrical resistance across layer 13 between the conductors 10 and 11 when the liquid level is elevationally above the elevation of layer 13 will be detectably less than when the liquid level is below the elevation of layer 13 and the gaps between layer 13 and the conductors 10 and 11 are emptied. Thus, the layer 13 creates an interruptible second resistance path between the conductors 10 and 11 which can be detected in relation to the first relatively high electrical resistance path through insulator 12.

When the liquid level drops, the resistance path across the insulator 12 will still exhibit less resistivity than the resistivity of the insulator material itself, because of the conductive layer across its surface even though the gaps separating that layer from conductors 10 and 11 are emptied of liquid. However, destruction of that layer at an elevated temperature would then create a detectable change in resistance at the insulator 12 and serve as an indication of the temperature change.

If desired, the conductive material in layer 13 can be selected as one having physical properties and electrical resistivity that will be modified in response to temperature changes when subjected to an elevated temperature above the working temperature of the liquid being monitored. It might burn, melt or otherwise change physically when its temperature exceeds a predetermined value, thereby leaving only insulator 12 as the remaining resistance path across the conductors 10 and 11. The liquid level detector would then serve two functions: first, it would detect a drop in liquid level; and secondly it would detect a subsequent appreciable rise in temperature. This modification would not detect reflooding of the liquid subsequent to the predetermined temperature rise.

FIGS. 3 and 4 show a modified arrangement utilizing upright conductors 20 and 21 spaced apart within an insulator 22. Discrete electrical conductors 23 are imbedded within insulator 12 between apertures through which the conductors 20 and 21 usually extend. If the ends of the conductors 23 are spaced slightly inward from the surfaces of the apertures within the insulator 12, a water accessible gap is assured analogous to that described with respect to the earlier embodiment. Again, the apertures and conductor ends must be very close in tolerance to the conductor diameters so that the liquid interface between the conductors 23 and conductors 20 and 21 will be very thin. This liquid interface will be very low in resistance, even though the liquid itself might have little conductivity as is the case when monitoring the level of pure water.

It is possible that the conductors 10 and 11 or 20 and 21 might not have sufficient resistance per unit length to provide accurate water level indications, particularly when used in a multiple detector to measure changes in liquid level. FIGS. 5 and 6 show an embodiment of the invention that would eliminate that problem.

In this third embodiment, upper and lower segments of the sensor are made from a metal-sheathed, metal oxide-filled, extruded cable. As an example, each segment might have a cylindrical sheath 24 of Zirconia and be filled with a solid mass 25 of Zirconia Oxide. The extruded segments might include conductors 26 and 27 of tungsten or other suitable metal in a coiled configuration. Coiling of the conductors increases their conductive length and total resistance per unit of length in the assembled sensor. Transition pieces or terminals can be connected to the coiled wire in each of the segments. As shown, the conductors 26 and 27 have electrical terminals 28 and 30 connected to their upper ends. Their lower ends are connected to electrically conductive means shown as bent metal plates 31 and 32 fixedly spaced by the insulating mass 25. The plates 31, 32 have outer spaced sections between the upper and lower segments which present a first, high resistance path between them across the liquid in which the sensor is immersed. Each plate also has a central section bent inwardly toward one another and defining a small open liquid accessible gap between their spaced adjacent surfaces. In this embodiment, the space between the plates 31 and 32 presents a "liquid accessible gap" having a lower electrical resistance across the conductors 26 and 27 when wet than when the gap is emptied.

The upper and lower segments are elevationally connected by straps 33 fixed to their outer surfaces which space them and are otherwise open for liquid access to the gap between the plates 31 and 32. This provides a physically stable device with a detectable resistance change across the two conductors when submerged in liquid, such as water.

Were the described embodiments used in liquid at or near saturation conditions with no increase in the temperature of the device itself, water vapor on the surfaces of the conductors above the water level might result in false readings of liquid level. This can be readily overcome by applying a fixed voltage or current across the two conductors from an external power source (not shown). The high temperature metals required in the conductors also exhibit high electrical resistance and lend themselves to effective resistance heating to evaporate any vapor condensed on the exposed conductor surfaces, leaving the surfaces dry. Changes in resistivity will be superimposed on the fixed voltage or current and readily detectable.

Various modifications might be made in the specific physical presentations of the invention without deviating from the basic disclosure.

What is claimed is:

1. A liquid level detector, comprising:
   a first upright electrical conductor;
   a second upright electrical conductor;
   electrical insulating means fixedly spacing the first and second conductors relative to one another across a first resistance path of relatively high electrical resistance;
   and electrically conductive means between the first and second conductors at a discrete location along their respective lengths for creating an interruptible second resistance path between them which includes a liquid accessible gap between said electrically conductive means and at least one of said conductors; the gap width being such that the electrical resistance across the second resistance path when the gap is filled with liquid is detectably less than when the gap is emptied.

2. A liquid level detector as claimed in claim 1 wherein the electrical resistance between the first and second conductors in the second resistance path across said electrically conductive means when the gap is emptied is detectably less than the electrical resistance across the first resistance path.

3. A liquid level detector as claimed in claim 1 wherein the electrical resistance between the first and second conductors in the second resistance path across said electrically conductive means when the gap is emptied is detectably less than the electrical resistance across the first resistance path;
   said electrically conductive means being of a material whose physical properties and electrical resistivity are modified in response to temperature change at a temperature above the working temperature of the liquid, whereby the resulting electrical resistance across said second resistance path is detectably altered.

4. A liquid level detector as claimed in claim 1 wherein said electrical insulating means comprises:
   a mass of electrical insulation material encircling the first and second conductors, said material having physical properties enabling it to remain structurally intact under the environmental conditions under which it is used;
   and said electrically conductive means comprises a layer of electrically conductive material arranged on the mass of electrical insulation material in a direction intersecting both the first and second conductors at preselected locations.

5. A liquid level detector as claimed in claim 1 wherein the layer of electrically conductive material is located on an exterior surface of the insulating material.

* * * * *